United States Patent
Lu (10) Patent No.: US 8,224,033 B2
(45) Date of Patent: Jul. 17, 2012

(54) MOVEMENT DETECTOR AND MOVEMENT DETECTION METHOD

(75) Inventor: Ya-Wen Lu, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1014 days.

(21) Appl. No.: 12/145,332

(22) Filed: Jun. 24, 2008

(65) Prior Publication Data

US 2009/0316958 A1    Dec. 24, 2009

(51) Int. Cl.
*G06K 9/00* (2006.01)

(52) U.S. Cl. .......... 382/107; 382/100; 382/255; 345/87; 348/452; 348/699

(58) Field of Classification Search ................ 382/100, 382/255, 107; 345/87; 348/452, 699
See application file for complete search history.

(56) References Cited

U.S. PATENT DOCUMENTS

| | | | |
|---|---|---|---|
| 4,288,815 A | 9/1981 | Miles | |
| 4,546,378 A | 10/1985 | Annegarn | |
| 4,688,084 A | 8/1987 | Achiha | |
| 4,794,454 A | 12/1988 | Sugiyama et al. | |
| 4,811,092 A | 3/1989 | Achiha et al. | |
| 4,884,136 A | 11/1989 | Ninomiya et al. | |
| 4,972,259 A | 11/1990 | Motoe et al. | |
| 4,979,036 A | 12/1990 | Carey Smith et al. | |
| 5,023,713 A | 6/1991 | Nishigori | |
| 5,032,914 A | 7/1991 | Fujita | |
| 5,043,807 A | 8/1991 | Rabii | |
| 5,500,689 A * | 3/1996 | Lam | 348/699 |
| 5,731,832 A * | 3/1998 | Ng | 348/155 |
| 5,786,872 A | 7/1998 | Miyazaki et al. | |
| 6,470,050 B1 * | 10/2002 | Ohtani et al. | 375/240.16 |
| 6,483,876 B1 * | 11/2002 | Chang et al. | 375/240.16 |
| 6,687,300 B1 | 2/2004 | Fujita et al. | |
| 7,567,300 B2 * | 7/2009 | Satou et al. | 348/609 |
| 2009/0022370 A1 * | 1/2009 | Yoo et al. | 382/107 |
| 2009/0059067 A1 * | 3/2009 | Takanohashi et al. | 348/452 |

(Continued)

FOREIGN PATENT DOCUMENTS

CN    1142164    2/1997

(Continued)

OTHER PUBLICATIONS

English language translation of abstract of JP 8242466 (published Sep. 17, 1996).
English language translation of abstract of CN 1142164 (published Feb. 5, 1997).

(Continued)

*Primary Examiner* — Andrew W Johns
*Assistant Examiner* — Shefali Goradia
(74) *Attorney, Agent, or Firm* — Thomas|Kayden (57) ABSTRACT

The invention provides a movement detector for a composite signal, comprising a frame delay unit, a first combiner, a second combiner and a third combiner. The frame delay unit receives the composite signal to generate a one-frame delayed signal, a two-frame delayed signal, and a three-frame delayed signal. The first combiner generates a first difference from a first pair of the composite signal, the one-frame delayed signal, the two-frame delayed signal, and the three-frame delayed signal. The second mean generates a second difference from a second pair of the composite signal, the one-frame delayed signal, the two-frame delayed signal, and the three-frame delayed signal. The first pair is different from the second pair. The third combiner generates a third difference for detecting motion based on the first difference and the second difference.

9 Claims, 7 Drawing Sheets

U.S. PATENT DOCUMENTS

2010/0158402 A1* 6/2010 Nagase et al. ............... 382/255

FOREIGN PATENT DOCUMENTS

| JP | 8242466 | 9/1996 |
| JP | 9307823 | 11/1997 |
| JP | 11146344 | 5/1999 |
| JP | 2000295581 | 10/2000 |

OTHER PUBLICATIONS

English language translation of abstract of JP 9307823 (published Nov. 28, 1997).

English language translation of abstract of JP 11146344 (published May 28, 1999).

English language translation of abstract of JP 2000295581 (published Oct. 20, 2000).

* cited by examiner

MOVEMENT DETECTOR AND MOVEMENT DETECTION METHOD

BACKGROUND OF THE INVENTION

1. Field of the Invention

The invention relates to a movement detector for a composite image signal, and more particularly to a movement detector resistant to phase errors in the composite signal.

2. Description of the Related Art

For composite PAL (Phase Alternating Line) signal decoding, two adjacent frames of a composite signal are not the same phase when sampling the video signal in phase with one of the U or V axes. Therefore, they can not be subtracted directly to derive the degree of movement. However, when sampling the video signal at 45 degrees off the U or V axes, two adjacent frames of a TV signal can have the same phase and can be subtracted to derive a movement signal.

Figure 1:
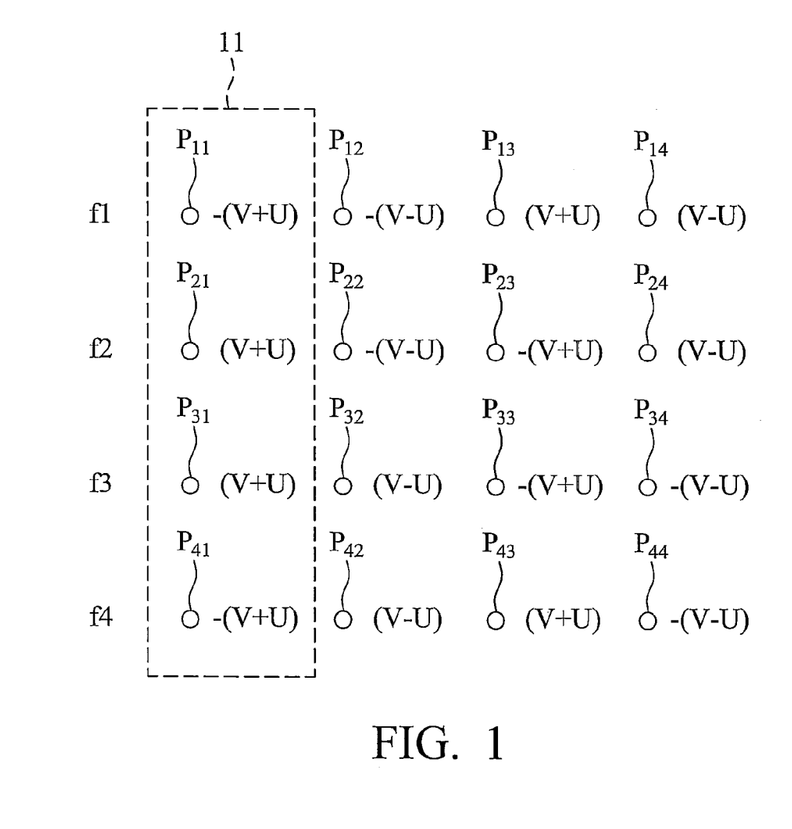
FIG. 1 is a schematic diagram of an example of ideal PAL vertical chrominance.

FIG. 1 is a schematic diagram of an ideal PAL vertical chrominance example. In FIG. 1, f1, f2, f3 and f4 indicates four continuous frames, and the pixels $P_{11}$ to $P_{14}$, $P_{21}$ to $P_{24}$, $P_{31}$ to $P_{34}$, and $P_{41}$ to $P_{44}$ are pixels at the same location in different frames. Take the pixels in the dotted frame 11 for example, Ideally, the in-phase pixel of the pixel $P_{11}$ in frame f1 is the pixel $P_{41}$ in the frame f4, in other words, the conventional movement signal detection method requires memory for storing at least four frames to derive the movement signal. If the received signal drifts or the received signal is not sampled at 45 degrees, incorrect movement signal detection and the required memory increases may occur.

Figure 2:
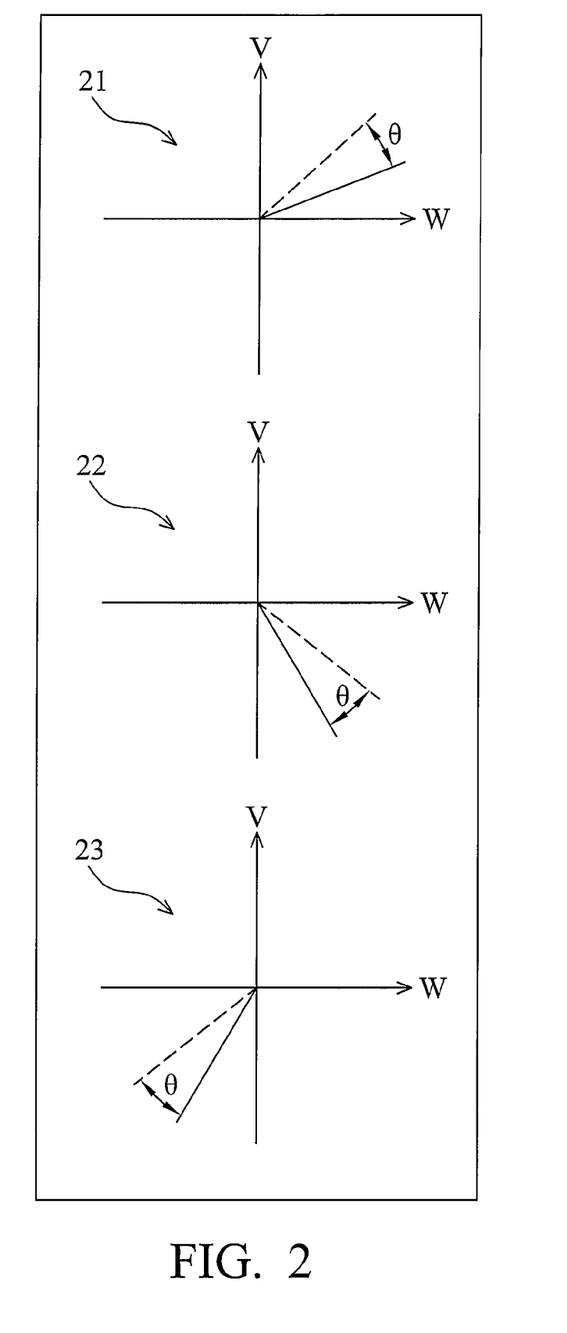
FIG. 2 is a diagram showing vectors and phase errors associated with three pixels of three continuous lines.

Please refer to FIG. 2. In FIG. 2, the vectors shown in 21, 22, and 23 indicates three pixels of three continuous lines. In 21, 22 and 23, a phase error θ occurs. Ideally, the received signal has the same phase error, such as shown in FIG. 2, however, the phase error may be not θ in 22 and 23, and this might cause incorrect movement signal detection.

Due to bad composite encoding or noise interference, there may be phase error when sampling the video signal at 45 degrees off the U or V axes. This phase error affects the accuracy of movement detection. This invention discloses a method for reducing the interference of phase error in movement detection.

BRIEF SUMMARY OF THE INVENTION

The invention provides a movement detector and movement detection method capable of reducing the effect caused by the phase error.

One embodiment of the movement detector for a composite signal comprises a frame delay unit, a first combiner, a second combiner and a third combiner. The frame delay unit receives the composite signal to generate a one-frame delayed signal, a two-frame delayed signal, and a three-frame delayed signal. The first combiner generates a first difference from a first pair of the composite signal, the one-frame delayed signal, the two-frame delayed signal, and the three-frame delayed signal. The second mean generates a second difference from a second pair of the composite signal, the one-frame delayed signal, the two-frame delayed signal, and the three-frame delayed signal. The first pair is different from the second pair. The third combiner generates a third difference for detecting motion based on the first difference and the second difference.

Some embodiments of the movement detection method for a composite signal, comprise receiving the composite image signal to generate four continuous frames; generating a first difference from a first pair of the four continuous frames; generating a second difference from a second pair of the four continuous frames, wherein the first pair is different from the second pair; generating a third difference based the first difference and the second difference; generating a motion detection signal based on the first difference, the second difference and the third difference.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 7:
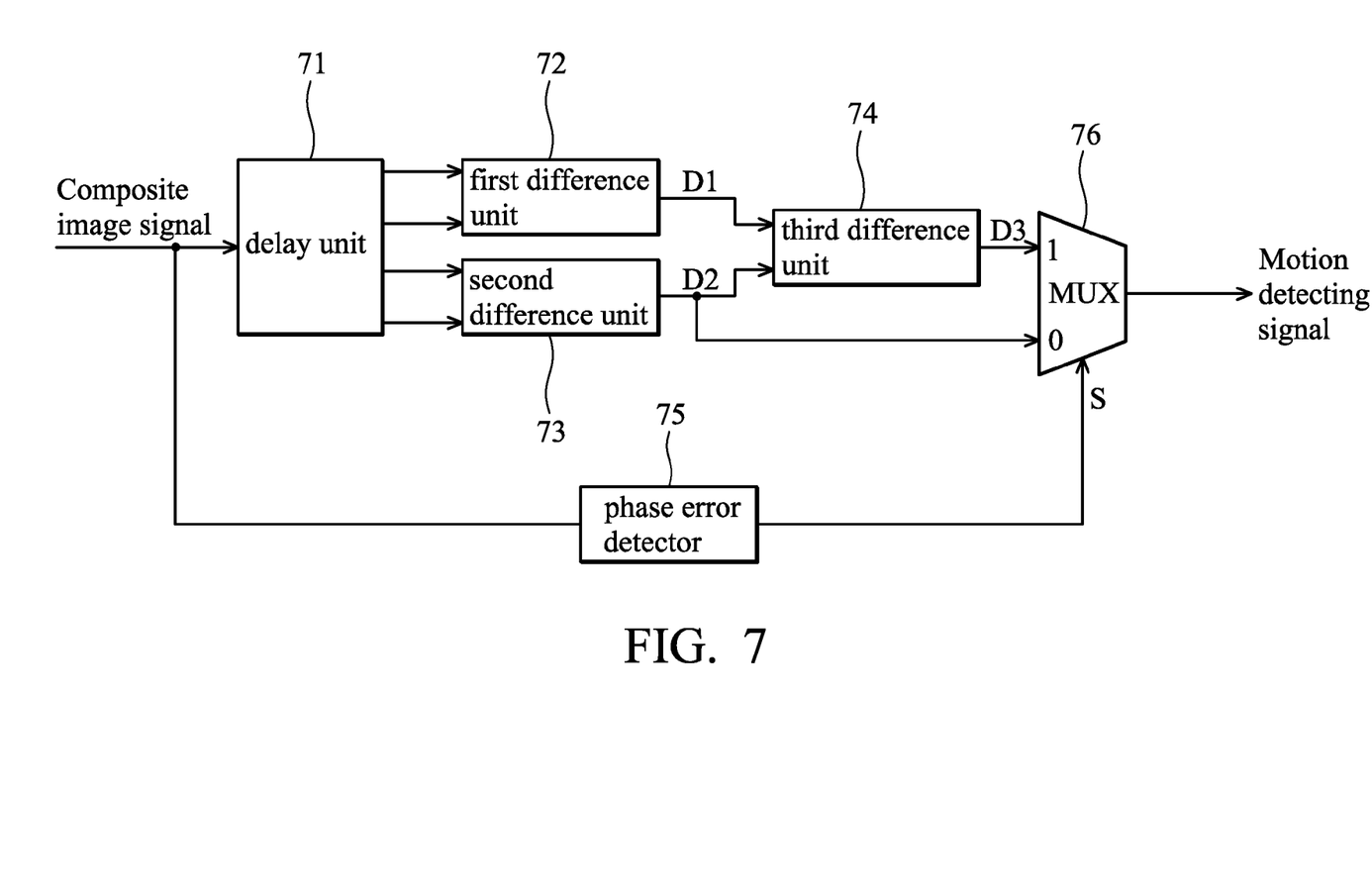
FIG. 7 is a block diagram of another embodiment of a movement detector of the invention.

FIG. 7 is a block diagram of an embodiment of a movement detector of the invention. The delay unit 71 receives a composite image signal, such as TV signal, to generate four continuous frames, the first frame, the second frame, the third frame and the fourth frame. The first difference unit 72 receives and generates a difference D1 between two of the four continuous frames. The first difference unit 73 receives and generates a difference D2 between two of the four continuous frames, wherein the two selected frames for generating the difference D2 are different from the two selected frames for generating the difference D1. In another embodiment, the difference D2 is generated by the remaining two frames. The third difference unit 74 receives the differences D1 and D2 to generate the difference D3. The multiplexer 76 has a first input terminal receiving the difference D3, a second input terminal receiving the difference D2, and an output terminal outputting a motion detection signal for image motion detection based on a phase error detection signal S. In another embodiment, the second input terminal of the multiplexer 76 receives the difference D1 instead of difference D2. The phase error detector 75 receives the composite image signal and outputs the phase error detection signal S. In this embodiment, the phase error detection signal S is logic 0 when no phase error exists, and the phase error detection signal S is logic 1 when phase error exists. In other words, the motion detection signal is the difference D3 when the phase error occurs in the composite image signal, and the motion detection signal is the difference D2 when there is no phase error in the composite image signal.

Figure 3:
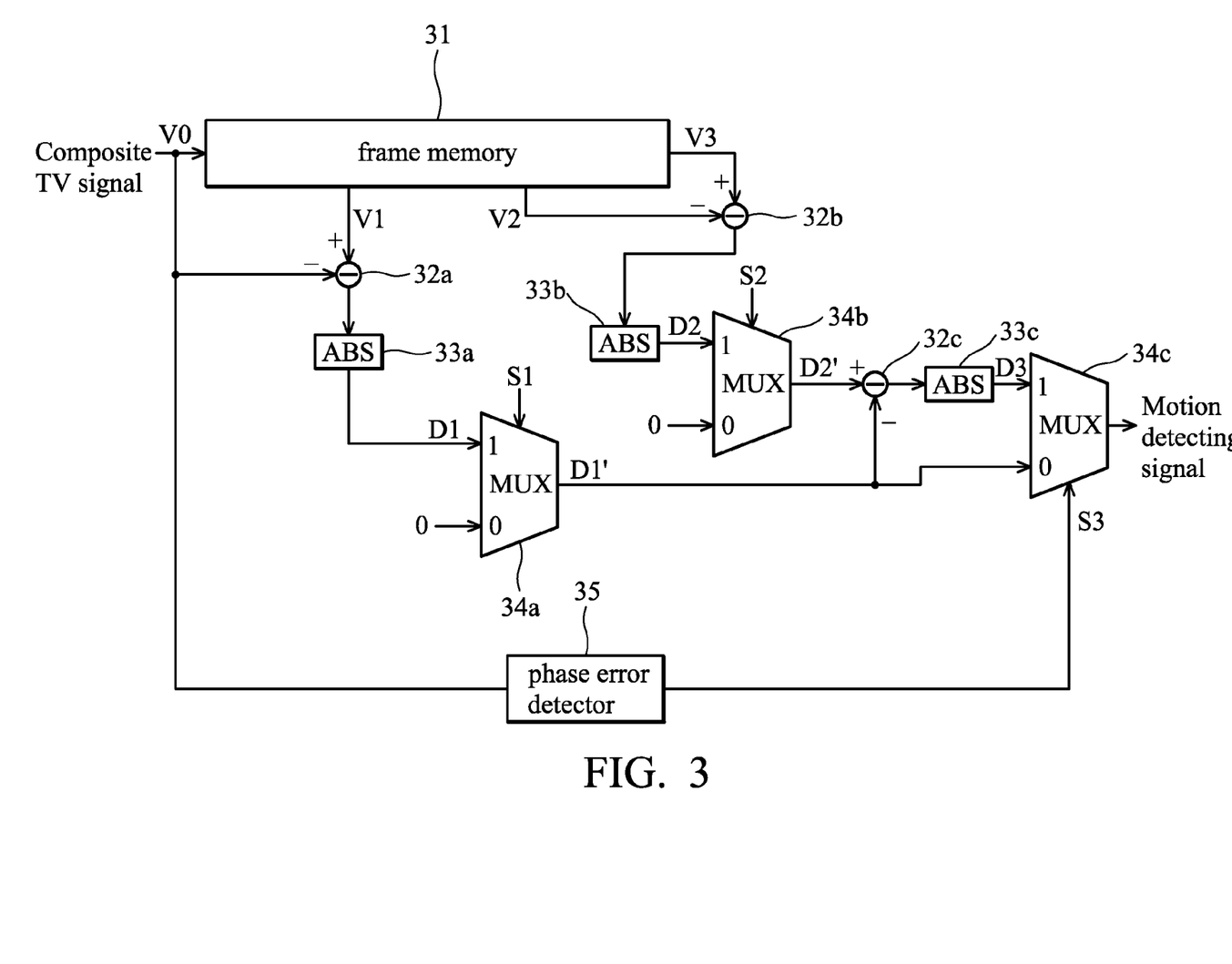
FIG. 3 is a block diagram of an embodiment of the movement detector of the invention.

FIG. 3 is a block diagram of another embodiment of the movement detector of the invention. The frame memory 31 receives the composite image signal V0 to generate a one-frame delayed signal V1, a two-frame delayed signal V2, a three-frame delayed signal V3. In one embodiment, the composite image signal V0, the one-frame delayed signal V1, two-frame delayed signal V2 and the three-frame delayed signal V3 are four continuous frames.

The adder 32a receives the composite image signal V0 and the one-frame delayed signal V1 to generate a first difference. The first difference is then transmitted to the absolute unit (ABS) 33a to generate the difference D1. The multiplexer 34a has a first input terminal receiving the difference D1, a second input terminal receiving a logic 0, and an output terminal outputting the difference D1' based on the in-phase selection signal S1. If the composite image signal V0 and the one-frame delayed signal V1 are in-phase, the in-phase selection signal S1 is logic 0 and the difference D1' is 0. If the composite image signal V0 and the one-frame delayed signal V1 are not in-phase, the in-phase selection signal S1 is logic 1 and the difference D1' is the difference D1. The adder 32b receives two-frame delayed signal V2 and the three-frame delayed signal V3 to generate a second difference. The second difference is then transmitted to the absolute unit (ABS) 33b to generate the difference D2. The multiplexer 34b has a first input terminal receiving the difference D2, a second input terminal receiving a logic 0, and an output terminal outputting the difference D2' based on the in-phase selection signal S2. If the two-frame delayed signal V2 and the three-frame delayed signal V3 are in-phase, the in-phase selection signal S2 is logic 0 and the difference D2' is 0. If the two-frame delayed signal V2 and the three-frame delayed signal V3 are not in-phase, the in-phase selection signal S2 is logic 1 and the difference D2' is the difference D2.

The adder 32c receives the difference D1' and the difference D2' to generate a third difference. The third difference is then transmitted to the absolute unit (ABS) 33c to generate the difference D3. The multiplexer 34c has a first input terminal receiving the difference D1', a second input terminal receiving the difference D3, and an output terminal outputting the motion detection signal for detecting motion based on the phase error signal S3. The phase error detector 35 receives the composite image signal and outputs the phase error detection signal S3. If no phase error exists in the composite image signal, phase error detection signal S3 is logic 0 and motion detection signal is the difference D1'. In another embodiment, If no phase error exists in the composite image signal, phase error detection signal S3 is logic 0 and motion detection signal is the difference D2' i.e. the first input terminal of the multiplexer 44c receives the difference D2'. If a phase error exists in the composite image signal, phase error detection signal S3 is logic 1 and the motion detection signal is the difference D3.

When the magnitude of the motion detection signal exceeds a threshold, the composite image signal is regarded as a motion image signal. When the magnitude of the motion detection signal does not exceed a threshold, the composite image signal is regarded as a still image. In some embodiment, there is no multiplexer 34c and no phase error detector 35. Thus, the D3 is outputted as the motion detecting signal.

Figure 4:
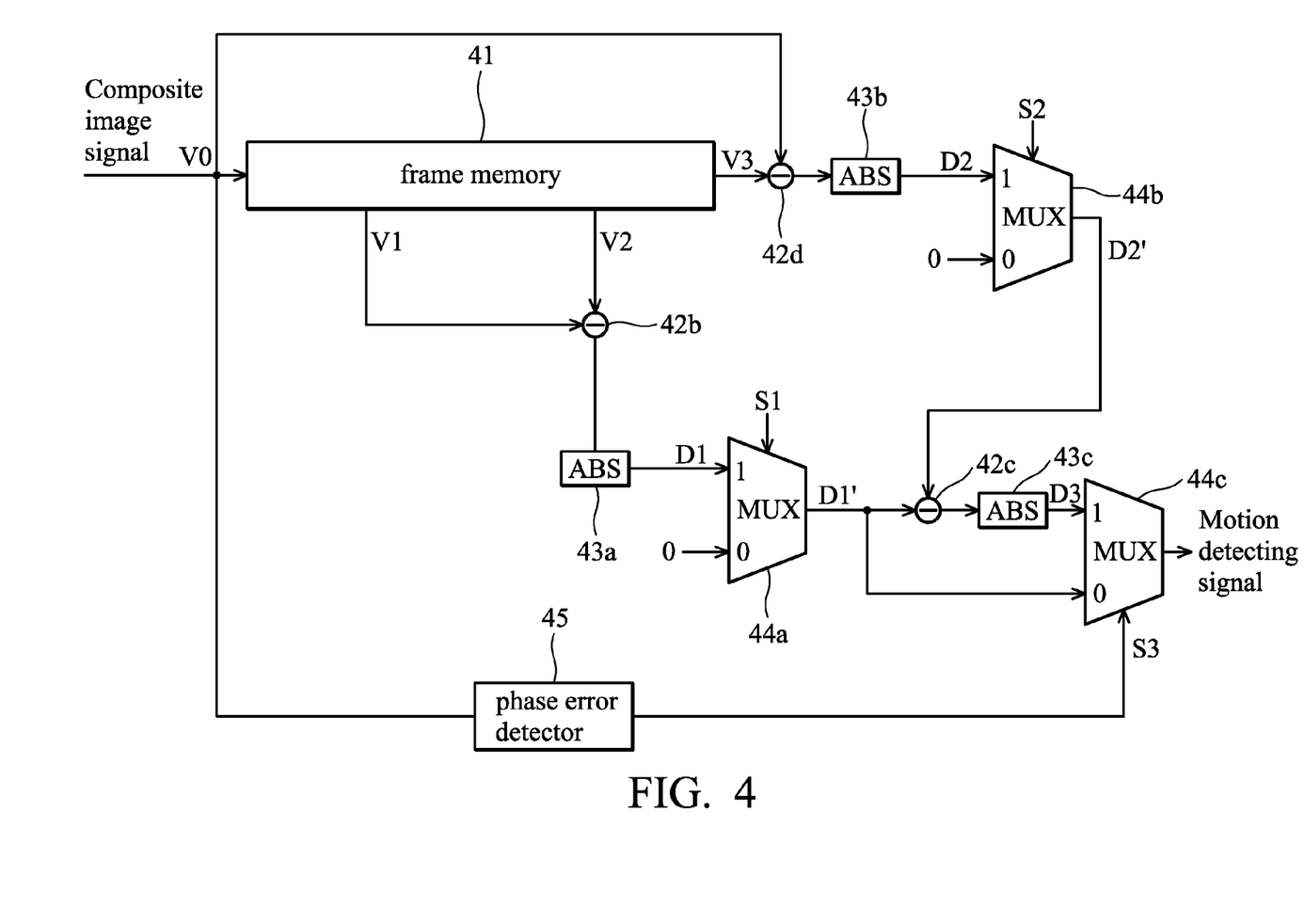
FIG. 4 is a block diagram of another embodiment of the movement detector of the invention.

FIG. 4 is a block diagram of another embodiment of the movement detector of the invention. The frame memory 41 receives the composite image signal V0 to generate a one-frame delayed signal V1, a two-frame delayed signal V2, and a three-frame delayed signal V3. In one embodiment, the composite image signal V0, the one-frame delayed signal V1, two-frame delayed signal V2 and the three-frame delayed signal V3 are four continuous frames.

The subtractor 42a receives the one-frame delayed signal V1 and the two-frame delayed signal V2 to generate a first difference. The first difference is then transmitted to the absolute unit (ABS) 43a to generate the difference D1. The multiplexer 44a has a first input terminal receiving the difference D1, a second input terminal receiving a logic 0, and an output terminal outputting the difference D1' based on the in-phase selection signal S1. If the composite image signal V0 and the one-frame delayed signal V1 are in-phase, the in-phase selection signal S1 is logic 0 and the difference D1' is 0. If the composite image signal V0 and the one-frame delayed signal V1 are not in-phase, the in-phase selection signal S1 is logic 1 and the difference D1' is the difference D1. The subtractor 42b receives the composite image signal V0 and the three-frame delayed signal V3 to generate a second difference. The second difference is then transmitted to the absolute unit (ABS) 43b to generate the difference D2. The multiplexer 44b has a first input terminal receiving the difference D2, a second input terminal receiving a logic 0, and an output terminal outputting the difference D2' based on the in-phase selection signal S2. If the two-frame delayed signal V2 and the three-frame delayed signal V3 are in-phase, the in-phase selection signal S2 is logic 0 and the difference D2' is 0. If the two-frame delayed signal V2 and the three-frame delayed signal V3 are not in-phase, the in-phase selection signal S2 is logic 1 and the difference D2' is the difference D2.

The subtractor 42c receives the difference D1' and the difference D2' to generate a third difference. The third difference is then transmitted to the absolute unit (ABS) 43c to generate the difference D3. The multiplexer 44c has a first input terminal receiving the difference D1', a second input terminal receiving the difference D3, and an output terminal outputting the motion detection signal for detecting motion based on the phase error signal S3. The phase error detector 45 receives the composite image signal and outputs the phase error detection signal S3. If no phase error exists in the composite image signal, phase error detection signal S3 is logic 0 and motion detection signal is the difference D1'. In another embodiment, If no phase error exists in the composite image signal, phase error detection signal S3 is logic 0 and motion detection signal is the difference D2', i.e. the first input terminal of the multiplexer 44c receives the difference D2'. If a phase error exists in the composite image signal, phase error detection signal S3 is logic 1 and the motion detection signal is the difference D3.

When the magnitude of the motion detection signal exceeds a threshold, the composite image signal is regarded as a motion image signal. When the magnitude of the motion detection signal does not exceed a threshold, the composite image signal is regarded as a still image.

Figure 5:
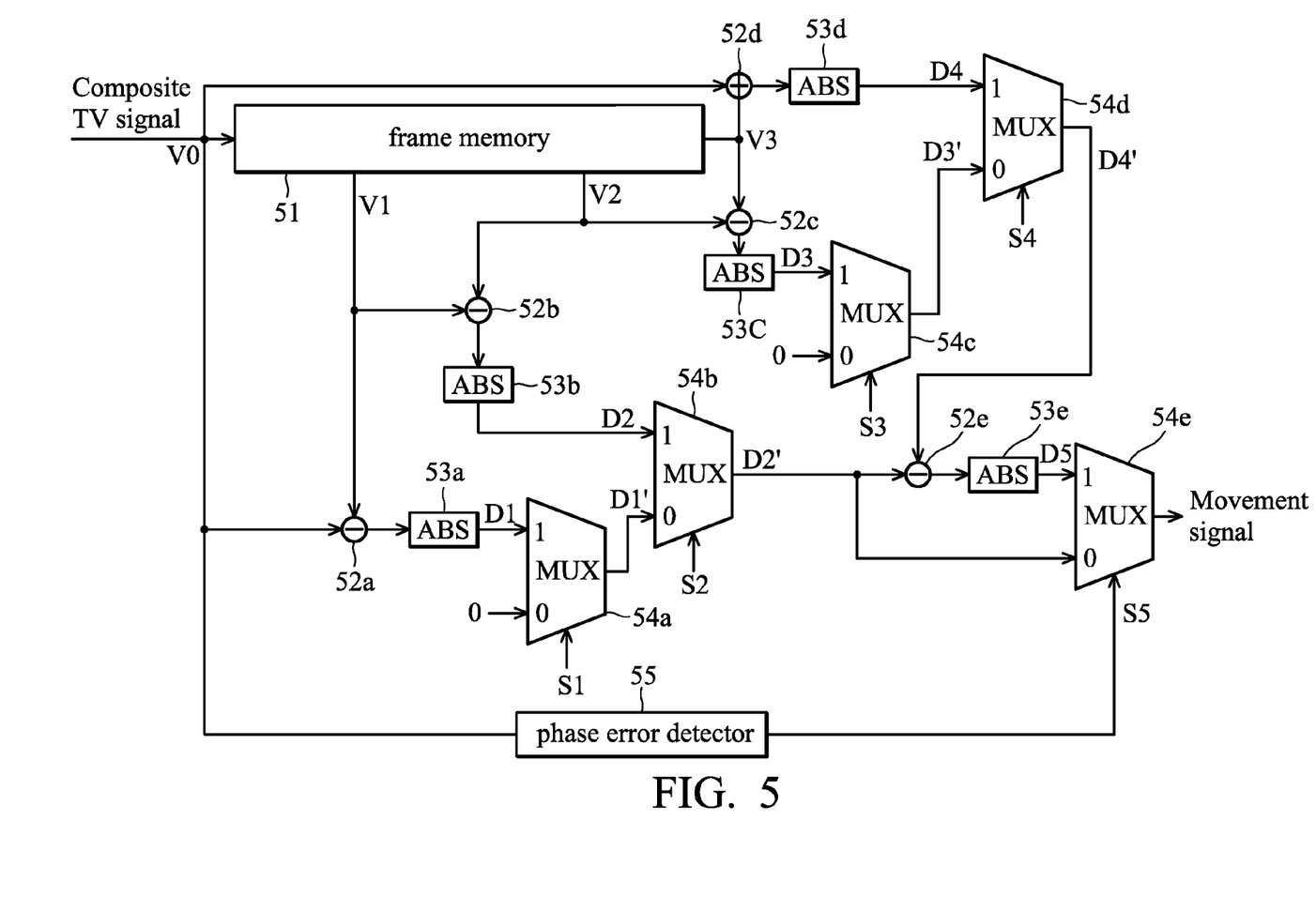
FIG. 5 is a block diagram of another embodiment of the movement detector of the invention.

FIG. 5 is a block diagram of another embodiment of the movement detector of the invention. The frame memory 51 receives the composite image signal V0 to generate a one-frame delayed signal V1, a two-frame delayed signal V2, and a three-frame delayed signal V3. In one embodiment, the composite image signal V0, the one-frame delayed signal V1, two-frame delayed signal V2 and the three-frame delayed signal V3 are four continuous frames.

The subtractor 52a receives the composite image signal V0 and the one-frame delayed signal V1 to generate a first difference. The first difference is then transmitted to the absolute unit (ABS) 53a to generate the difference D1. The multiplexer 54a has a first input terminal receiving the difference D1, a second input terminal receiving a logic 0, and an output terminal outputting the difference D1' based on the in-phase selection signal S1. If the composite image signal V0 and the one-frame delayed signal V1 are in-phase, the in-phase selection signal S1 is logic 0 and the difference D1' is 0. If the composite image signal V0 and the one-frame delayed signal V1 are not in-phase, the in-phase selection signal S1 is logic 1 and the difference D1' is the difference D1. The subtractor 52b receives the one-frame delayed signal V1 and the two-frame delayed signal V2 to generate a second difference. The second difference is then transmitted to the absolute unit (ABS) 53b to generate the difference D2. The multiplexer 54b has a first input terminal receiving the difference D2, a second input terminal receiving the difference D1', and an output terminal outputting the difference D2' based on the in-phase selection signal S2. If the composite image signal V0 and the one-frame delayed signal V1 are in-phase, the in-phase selection signal S2 is logic 0 and the difference D2' is the difference D1'. If the composite image signal V0 and the one-frame delayed signal V1 are not in-phase, the in-phase selection signal S2 is logic 1 and the difference D2' is the difference D2.

The subtractor 52c receives two-frame delayed signal V2 and the three-frame delayed signal V3 to generate a third difference. The third difference is then transmitted to the absolute unit (ABS) 33b to generate the difference D3. The multiplexer 54c has a first input terminal receiving the difference D3, a second input terminal receiving a logic 0, and an output terminal outputting the difference D3' based on the in-phase selection signal S3. If the two-frame delayed signal V2 and the three-frame delayed signal V3 are in-phase, the in-phase selection signal S3 is logic 0 and the difference D3' is 0. If the two-frame delayed signal V2 and the three-frame delayed signal V3 are not in-phase, the in-phase selection signal S3 is logic 1 and the difference D3' is the difference D3. The subtractor 52d receives the composite image signal V0 and the three-frame delayed signal V3 to generate a fourth difference. The fourth difference is then transmitted to the absolute unit (ABS) 53d to generate the difference D4. The multiplexer 54d has a first input terminal receiving the difference D3, a second input terminal receiving the difference D3', and an output terminal outputting the difference D4' based on the in-phase selection signal S4. If the two-frame delayed signal V2 and the three-frame delayed signal V3 are in-phase, the in-phase selection signal S4 is logic 0 and the difference D4' is the difference D3'. If the two-frame delayed signal V2 and the three-frame delayed signal V3 are not in-phase, the in-phase selection signal S4 is logic 1 and the difference D4' is the difference D4.

The subtractor 52e receives the difference D2' and the difference D4' to generate a fifth difference. The fifth difference is then transmitted to the absolute unit (ABS) 33c to generate the difference D5. The multiplexer 54e has a first input terminal receiving the difference D2', a second input terminal receiving the difference D5, and an output terminal outputting the motion detection signal for detecting motion based on the phase error signal S5. The phase error detector 55 receives the composite image signal and outputs the phase error detection signal S5. If no phase error exists in the composite image signal, phase error detection signal S5 is logic 0 and motion detection signal is the difference D2'. In another embodiment, If no phase error exists in the composite image signal, phase error detection signal S5 is logic 0 and motion detection signal is the difference D4' i.e. the first input terminal of the multiplexer 54e receives the difference D4'. If a phase error exists in the composite image signal, phase error detection signal S2 is logic 1 and the motion detection signal is the difference D5.

When the magnitude of the motion detection signal exceeds a threshold, the composite image signal is regarded as a motion image signal. When the magnitude of the motion detection signal does not exceed a threshold, the composite image signal is regarded as a still image.

Figure 6:
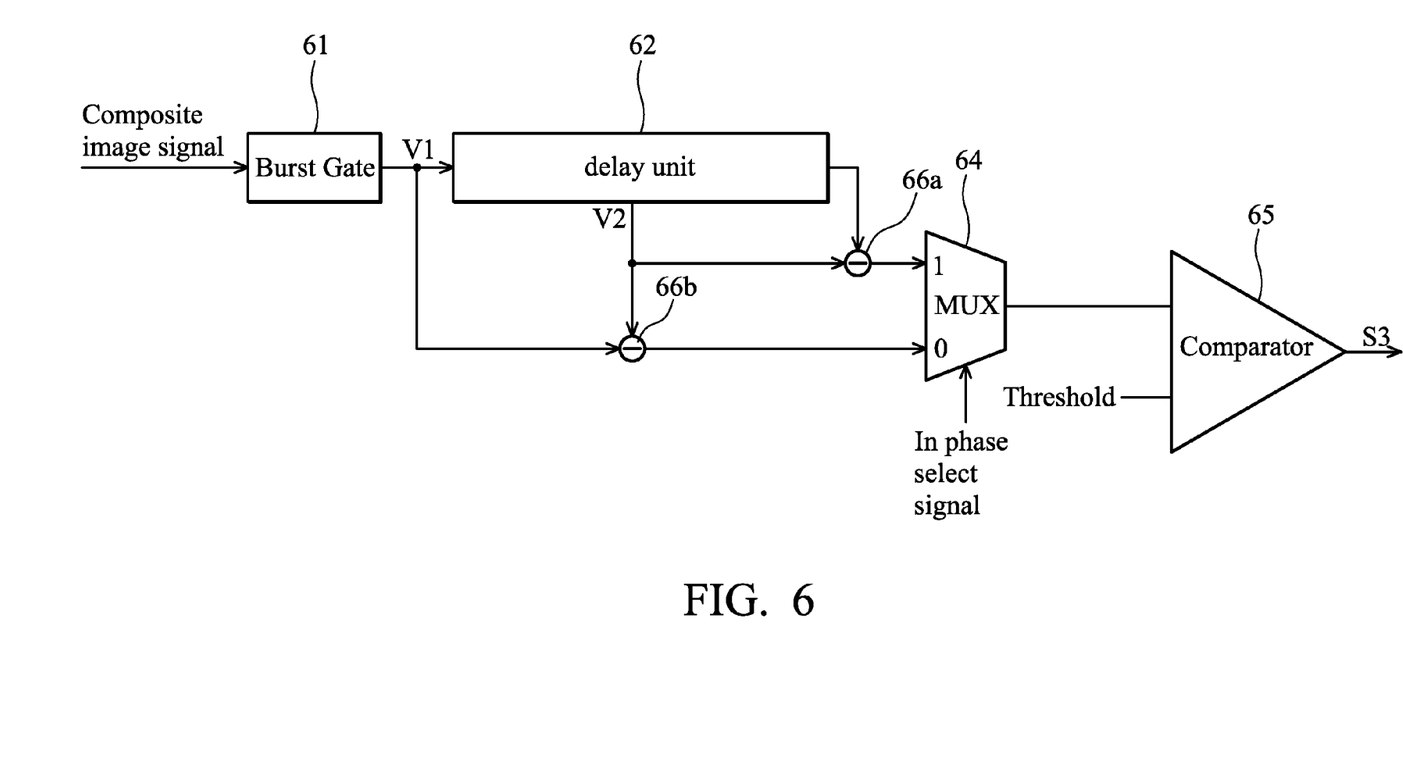
FIG. 6 is a block diagram of an embodiment of the phase error detector of the invention.

FIG. 6 is a block diagram of another embodiment of a movement detector of the invention. A burst gate 61 receives and synchronizes the composite image signal. The delay unit 62 outputs a one-frame delayed signal and a two-frame delayed signal. Please note that the delay units 62 may be used the frame memory 31, 41, 51 as shown in FIG. 3-5. The substrator 66a receives the composite image signal and the one-frame delayed signal to generate a first difference. The substrator 66b receives the one-frame delayed signal and the two-frame delayed signal to generate a second difference. The multiplexer 64 receives the first difference and the second difference, and output a difference signal to the comparator 65 based on the in-phase select signal. The comparator 65 compares the difference signal with a predetermined threshold value to output the signal S3.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A movement detector, comprising:
   A frame delay unit receiving a composite signal to generate a one-frame delayed signal, a two-frame delayed signal, and a three-frame delayed signal;
   a first combiner for generating a first difference from a first pair of the composite signal, the one-frame delayed signal, the two-frame delayed signal, and the three-frame delayed signal;
   a second combiner for generating a second difference from a second pair of the composite signal, the one-frame delayed signal, the two-frame delayed signal, and the three-frame delayed signal, wherein the second pair is different from the first pair;
   a third combiner for generating a third difference for detecting motion based on the first difference and the second difference; and
   a first in-phase selector for generating an output of the first in-phase selector according to whether an absolute value of the first difference is in-phase, wherein an output of the first in-phase selector is equal to the absolute value of the first difference if two signal in the first pair are in-phase; otherwise, the output of the first in-phase selector is equal to zero.

2. The detector as claimed in claim 1, further comprising a second in-phase selector for generating the output of the second in-phase selector according to whether an absolute value of the second difference is in-phase, wherein an output of the second in-phase selector is equal to the absolute value of the second difference if two signal in the second pair are in-phase; otherwise, the output of the second in-phase selector is equal to zero.

3. The detector as claimed in claim 2, further comprising a multiplexer having a first input terminal for receiving an absolute value of the third difference, a second input terminal receiving the absolute value of the first difference or the absolute value of the second difference, and an output terminal outputting the signal from the first input terminal or the second input terminal for detecting motion.

4. The detector as claimed in claim 3, further comprising a phase error detector for generating a phase error indication signal to select the absolute value of the third difference or the absolute value of the first difference as the outputted signal for detecting motion.

5. The detector as claimed in claim 4, wherein the phase error indication signal is determined based on at least two continuous frames.

6. A movement detection method, comprising:
receiving a composite image signal to generate four continuous frames;
generating a first difference from a pair of the four continuous frames;
generating a second difference from another pair of the four continuous frames, wherein the first difference is different from the second difference;
generating a third difference based the first difference and the second difference;
generating a motion detection signal based on the first difference, the second difference and the third difference;
taking an absolute value for the first difference, an absolute value for the second difference, and an absolute value for the third difference; and
generating a first selected difference and a second select difference,
wherein the first selected difference is equal to the absolute value of the first difference when two signal in the first pair are not in-phase and the first selected difference is equal to zero when the two signal in the first pair are in-phase,
wherein the second selected difference is equal to the absolute value of the second difference when two signal in the second pair are not in-phase and the second selected difference is equal to zero when the two signal in the second pair are in-phase.

7. The method as claimed in claim 6, further comprising performing the phase error detection based on at least two continuous frames.

8. The method as claimed in claim 7, wherein when the composite signal has a phase error greater than a predetermined threshold, the motion detection signal is generated based on the third difference.

9. The method as claimed in claim 7, wherein when the composite signal has a phase error less than a predetermined threshold, the movement detection is based on the first difference or the second difference.

* * * * *